(No Model.)
E. THEISEN.
APPARATUS FOR CONDENSING AND COOLING PURPOSES.
No. 377,504. Patented Feb. 7, 1888.
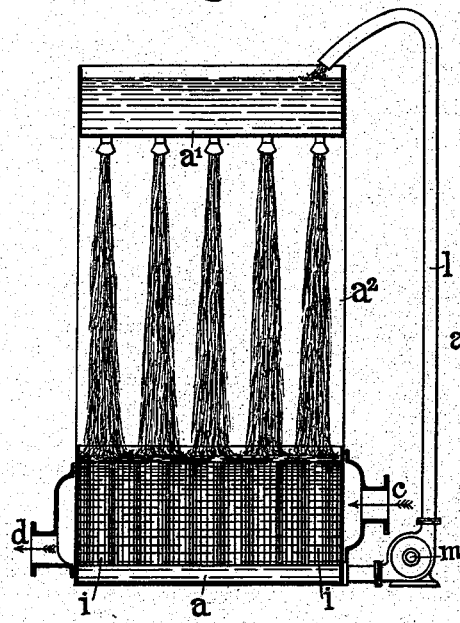
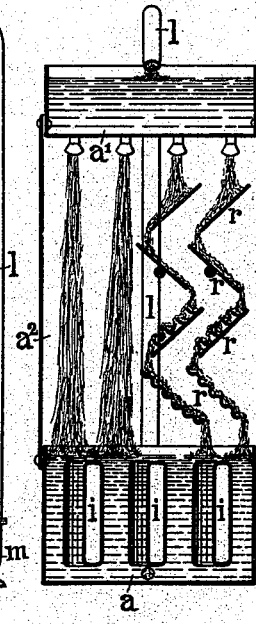
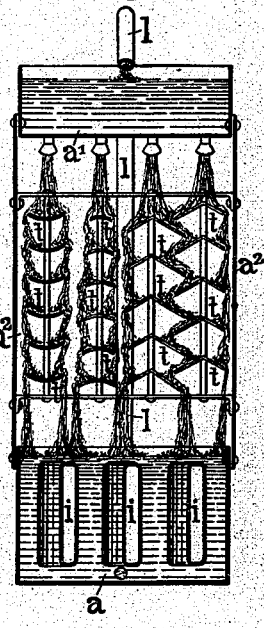
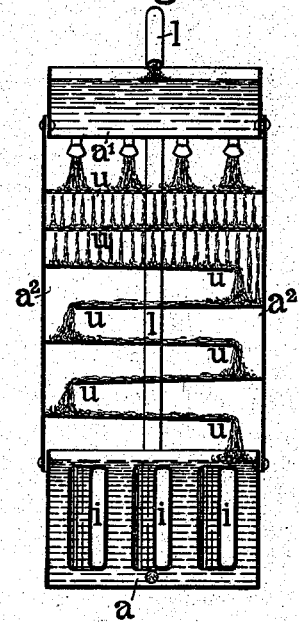
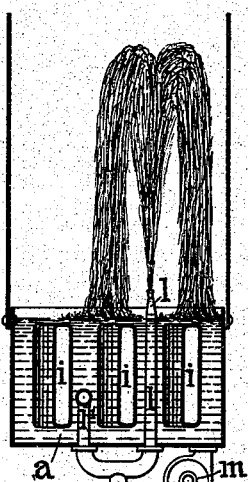
Witnesses
Chas. H. Smith
J. Staib
Inventor
Eduard Theisen
per Lemuel W. Serrell, Atty

UNITED STATES PATENT OFFICE.

EDUARD THEISEN, OF COLOGNE, PRUSSIA, GERMANY.

APPARATUS FOR CONDENSING AND COOLING PURPOSES.

SPECIFICATION forming part of Letters Patent No. 377,504, dated February 7, 1888.

Application filed April 4, 1887. Serial No. 233,575. (No model.) Patented in Germany July 26, 1885, No. 37,250; in France October 1, 1885, No. 171,435, and in England March 1, 1886, No. 2,927.

*To all whom it may concern:*

Be it known that I, EDUARD THEISEN, of Cologne, Kingdom of Prussia, German Empire, machine-manufacturer, have invented an Improvement in Apparatus for Condensing and Cooling Purposes, of which the following is a specification.

According to this invention a hollow body of appropriate shape and construction, into which the gaseous or liquid substance to be condensed or cooled is introduced, is employed in combination with devices by means of which a given quantity of cooling or condensing liquid is kept down to the temperature necessary for its action, by exposing the same in a subdivided condition to contact with the air. This contact of the liquid with the air is caused by the liquid being constantly raised from the vessel surrounding the above-mentioned hollow body, and returned from the height in a subdivided condition through the air to the hollow body or bodies; or said contact of the air may be caused by blowing air through said liquid.

By this improvement only a small bulk of condensing or cooling liquid is required, it being only necessary to add such quantity as evaporates from time to time.

The cooling liquid is very efficient in its action upon the hollow vessels.

In the drawings, Figure 1 is a longitudinal section, and Fig. 2 a cross-section, of my apparatus. Figs. 3, 4, and 5 are vertical sections of modifications of my apparatus.

The apparatus illustrated in Figs. 1 and 2 consists of two vessels, $a$ and $a'$, arranged one above the other, of which the vessel $a$ contains the hollow vessels $i$, made of plain or undulated or ribbed sheets or plates of metal, into which vessels the steam to be condensed or the liquid to be cooled is introduced at $c$, and the product of condensation or the cooled fluid is led off at $d$. The liquid surrounding the hollow bodies $i$ in the vessel $a$ is raised, by a pump, $m$, or by other means, into the vessel $a'$, and returns, by way of roses or sprinklers under the bottom of the vessel $a'$, as rain or spray. For the more energetic action of the air-current in cooling said rain or spray it is preferable to provide side walls, $a^2$, between the vessels $a$ and $a'$ at the sides parallel to the current of air.

By introducing sheets or plates $r$, which may be plain or undulated or ribbed and inclined in alternate opposite directions, as seen in Fig. 2, and fixed or movable by rods, the falling liquid is detained in the air; or plates, disks, or inclined surfaces $t$, Fig. 3, may be used for the same purposes; or perforated or alternately-inclined plates $u$, Fig. 4, may be used for prolonging the time the cooling water is exposed to the action of the current of air.

Fig. 5 shows a modification of the apparatus, in which the vessel $a'$ is dispensed with and the liquid that has been raised in temperature by the influence of the contents of the hollow vessels $i$ within the vessel $a$ is forced, by means of pump $m$, through the pipe $l$ in the form of a fountain, either in jets or sheets, into the current of air above the vessel $a$, thereby cooling the liquid before it drops back into said vessel.

Instead of forcing the cooling or condensing liquid through the air above the vessel $a$, the air may be forced by pipe $l'$, Fig. 5, through the liquid to reduce the temperature of the latter, by bringing small currents of air violently into contact with the cooling liquid.

Instead of submerging the hollow vessels $i$ entirely into the vessel $a$, they may be above said vessel $a$, so that the latter serves as a receiving or collecting vessel for the cooling or condensing liquid, the hollow vessels being struck by the rain or shower. The height which the liquid may fall can be increased so as to obtain a sufficient reduction in temperature in the cooling of condensed liquid.

I claim as my invention—

1. The combination, with the vessel $a$ and the elevated vessel $a'$, for containing cooling liquid, of hollow vessels $i$ within and passing through the vessel $a$, for containing the liquid to be cooled, a pump and pipes for transferring the liquid from the vessel $a$ up into the vessel $a'$, and mechanism, substantially as specified, connected to the under side of the vessel $a'$, whereby its contents are discharged downwardly in a finely-divided state through the air, and are thereby cooled and fall into the vessel $a$, substantially as set forth.

2. The combination, with the vessel $a$ and the elevated vessel $a'$, for containing cooling liquid, of hollow vessels $i$ within and passing through the vessel $a$, for containing the liquid to be cooled, a pump and pipes for transferring the liquid from the vessel $a$ up into the vessel $a'$, spray roses or faucets upon the under side of the vessel $a'$, and plates located between the vessels $a$ $a'$, whereby the contents of the vessel $a'$ are discharged downwardly in a finely-divided state and temporarily arrested by the plates and cooled in passage through the air, and finally fall into the vessel $a$, substantially as specified.

In testimony that I claim the foregoing as my invention, I have signed my name in presence of two subscribing witnesses.

EDUARD THEISEN.

Witnesses:
CARL KNOOP,
WILHELM WIESENHÜTTER.